US006785866B1

(12) United States Patent
Lewis et al.

(10) Patent No.: US 6,785,866 B1
(45) Date of Patent: Aug. 31, 2004

(54) DIALOGS FOR MULTIPLE OPERATING SYSTEMS AND MULTIPLE LANGUAGES

(75) Inventors: Lance Lewis, San Ramon, CA (US); David W. Clark, Gilroy, CA (US); Thomas Costa, San Francisco, CA (US); Mark Hamburg, Scotts Valley, CA (US); Thomas W. McRae, San Jose, CA (US); Randolph A. Strauss, Mountain View, CA (US)

(73) Assignee: Adobe Systems Incorporated, San Jose, CA (US)

(*) Notice: Subject to any disclaimer, the term of this patent is extended or adjusted under 35 U.S.C. 154(b) by 0 days.

(21) Appl. No.: 09/071,289

(22) Filed: May 1, 1998

(51) Int. Cl.[7] .......................... G06F 15/00; G06F 17/21; G06F 17/00
(52) U.S. Cl. ..................... 715/513; 715/536; 725/139; 345/801
(58) Field of Search ............................. 707/513, 536, 707/9; 395/339; 345/334, 762, 764, 801; 725/139; 715/513, 536

(56) References Cited

U.S. PATENT DOCUMENTS

| | | | | |
|---|---|---|---|---|
| 5,583,761 A | * | 12/1996 | Chou | 707/536 |
| 5,583,982 A | * | 12/1996 | Matheny et al. | 345/762 |
| 5,671,378 A | * | 9/1997 | Acker et al. | 345/334 |
| 5,673,401 A | * | 9/1997 | Volk et al. | 725/139 |
| 5,721,848 A | * | 2/1998 | Joseph | 395/339 |
| 5,786,815 A | * | 7/1998 | Ford | 345/744 |
| 5,920,861 A | * | 7/1999 | Hall et al. | 707/9 |
| 6,111,573 A | * | 8/2000 | McComb et al. | 345/334 |
| 6,146,027 A | * | 11/2000 | Orton et al. | 345/764 |
| 6,178,432 B1 | * | 1/2001 | Cook et al. | 707/513 |

OTHER PUBLICATIONS

Myers, Brad A., User interface software tools, ACM Transactions on Computer-Human Interaction, vol. 2, Issue 1, Mar. 1995, pp. 64–103.*

"Backward Compatibility to Native Presentation Manager from an Extended Presentation Manage Architecture", IBM Technical Disclosure Bulletin, vol. 37, No. 3, 3/94, p. 545.

Montgomery et al., "A Distributed Graphical User Interface Component of a Plant Floor System Enabler", 8079 Electro Conference Record, May 12–14, 1992, N.Y., pp. 526–531.

* cited by examiner

Primary Examiner—Joseph H. Feild
Assistant Examiner—William L. Bashore
(74) Attorney, Agent, or Firm—Fish & Richardson P.C.

(57) ABSTRACT

The present invention provides a method for a developer to create and display a "dialog definition", i.e., a description of the dialog that has the position and size of its constituent elements expressed in relative layout rules. These layout rules include expressions of alignment and/or justification of the elements within a container, rather than expressions of the coordinate positions of the elements. In addition, a set of text strings is provided for each language in a separate language file. The user may identify an operating system and a language in which the dialog will be displayed, and the size of the elements in the identified operating system and language will be determined by the computer. The description is interpreted in the computer to lay out the dialog.

44 Claims, 9 Drawing Sheets

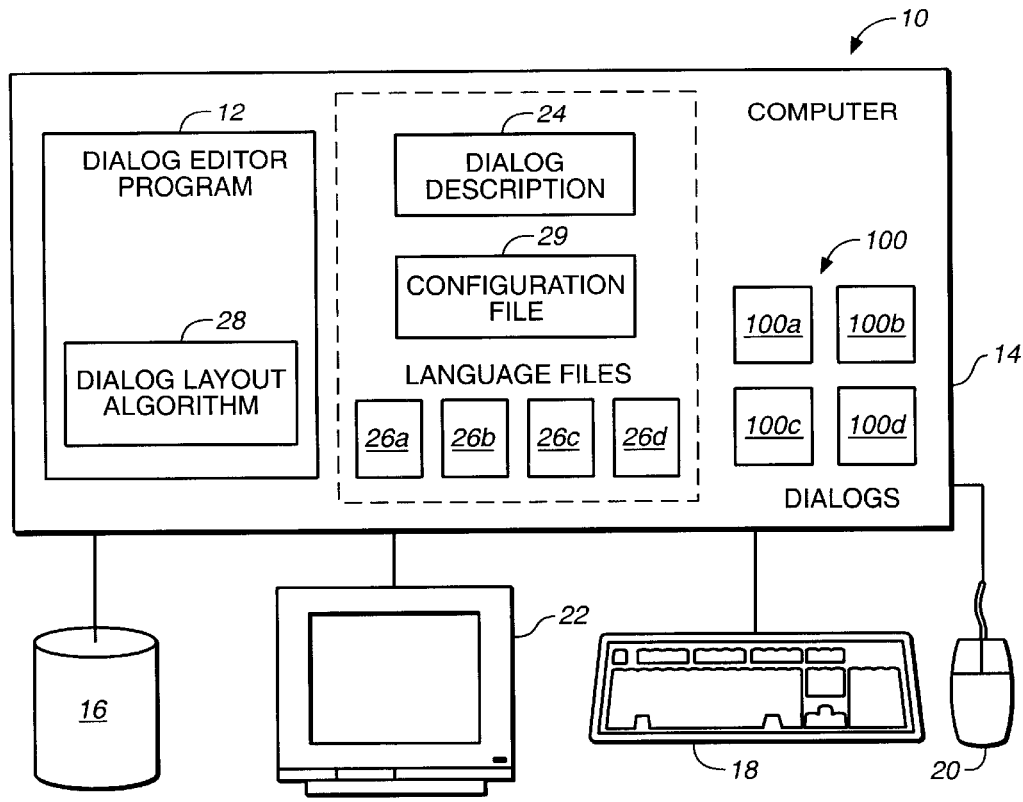
FIG._1
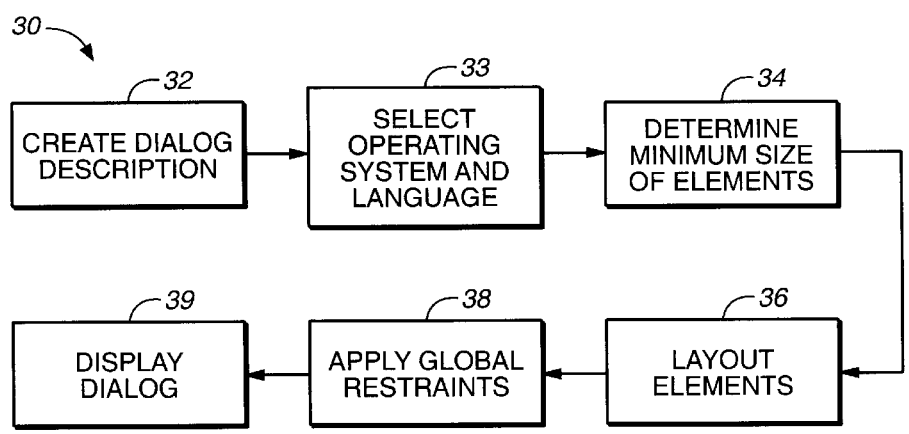
FIG._2

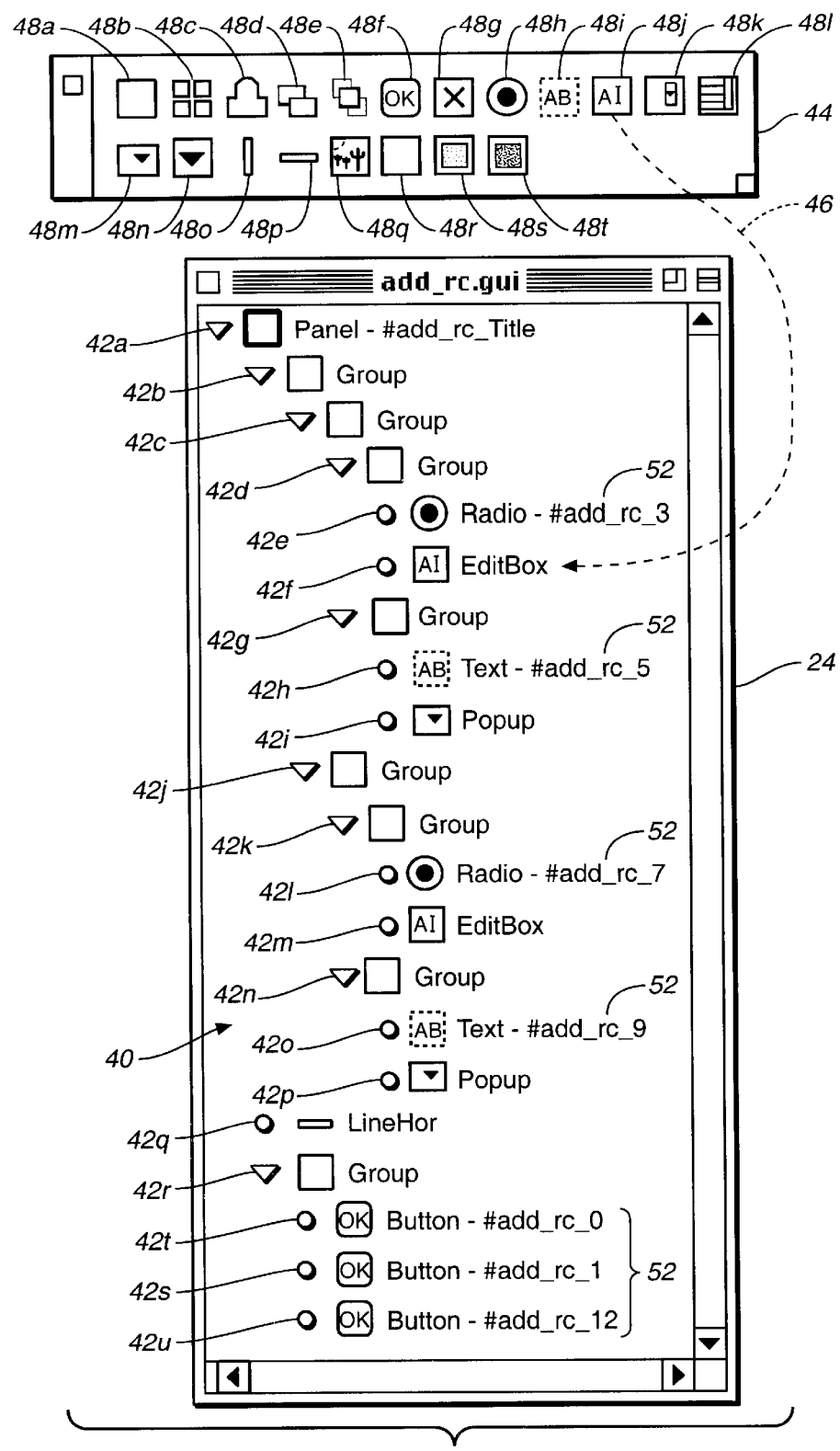
FIG._3

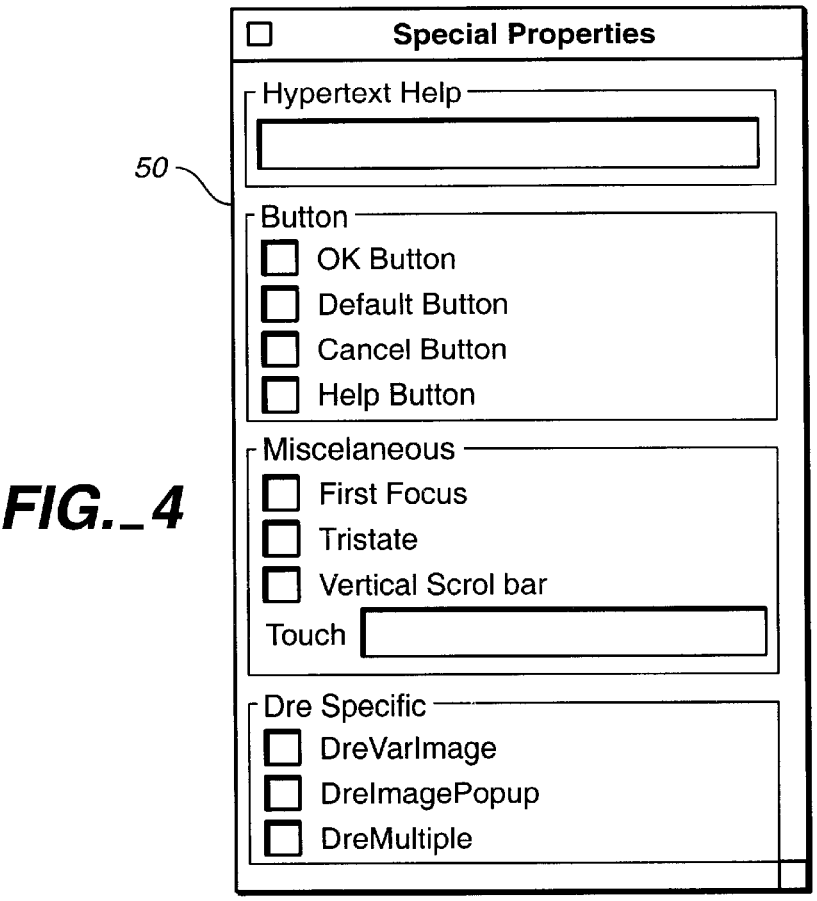
FIG._4
FIG._5A
| KEY | VALUE |
|---|---|
| add_rc_0 | &Add |
| add_rc_1 | Cancel |
| add_rc_Title | Add Rows or Columns |
| add_rc_3 | A&dd |
| add_rc_4_width | 999 |
| add_rc_5 | Row(s): |
| add_rc_6_width | mmmmmmmmmmfl |
| add_rc_7 | Add |
| add_rc_8 | 2 |
| add_rc_8_width | 999 |
| add_rc_9 | Column(s): |
| add_rc_10_width | mmmmmmmmmmfl |
| add_rc_12 | &Help |

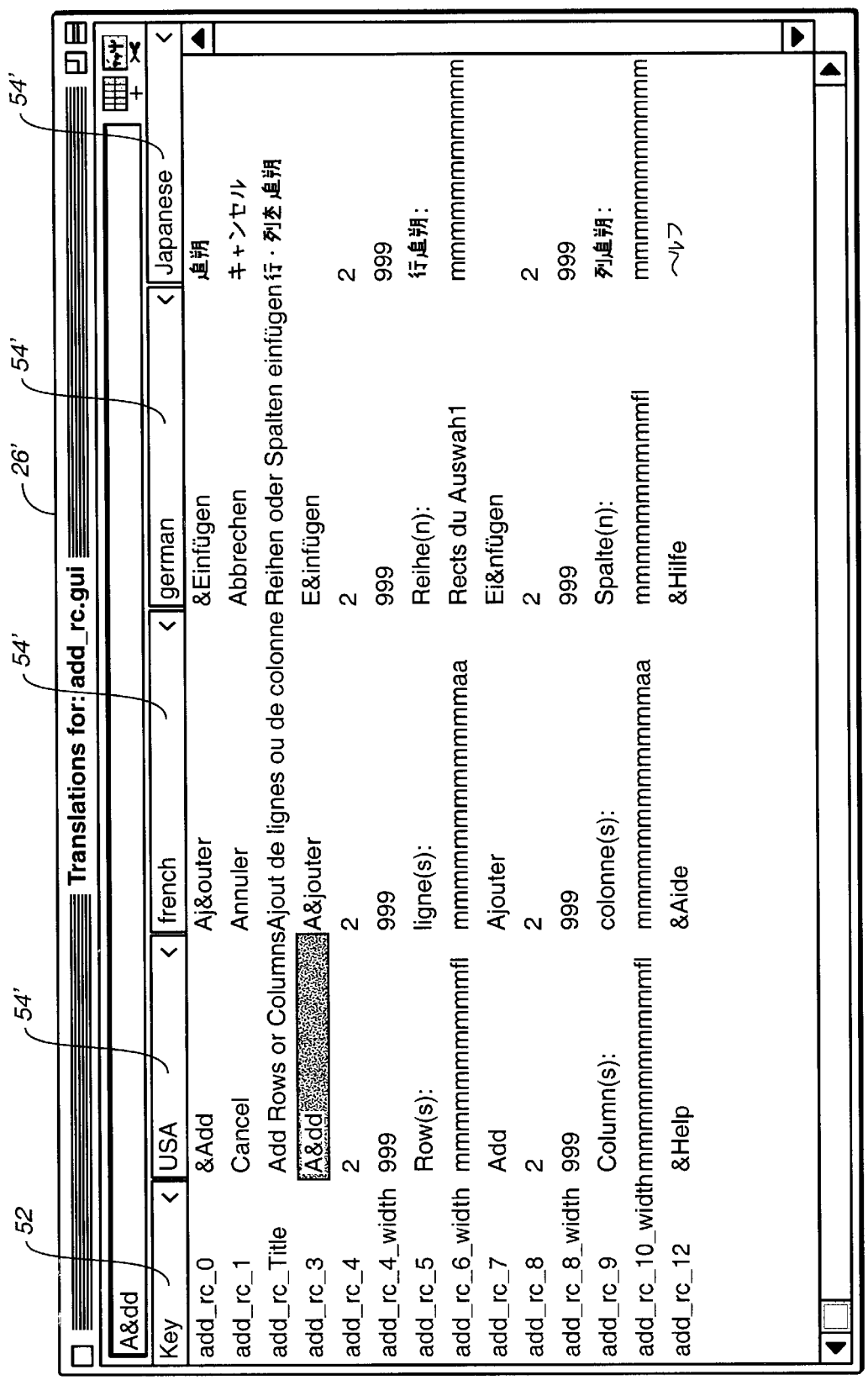
FIG._5B

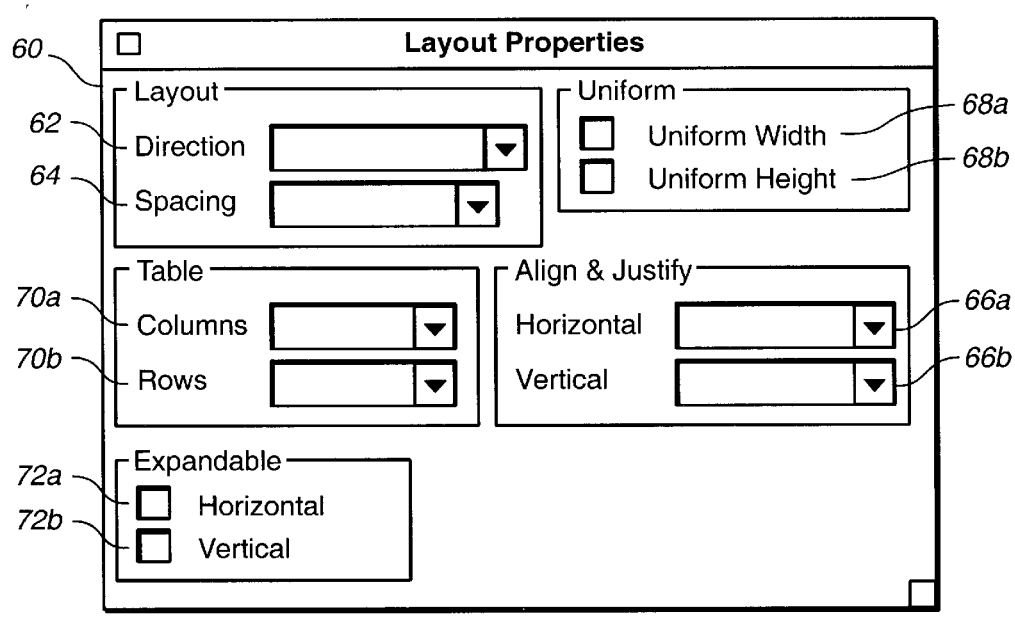
FIG._6
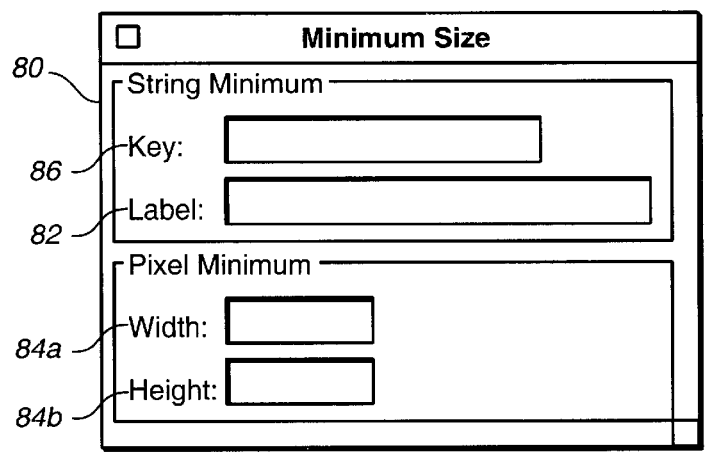
FIG._7
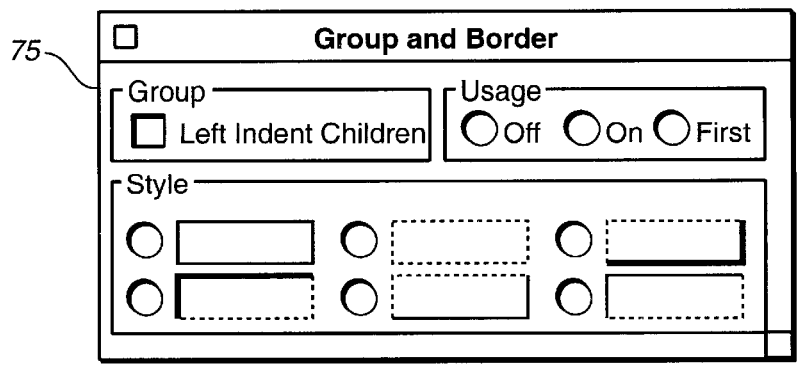
FIG._8

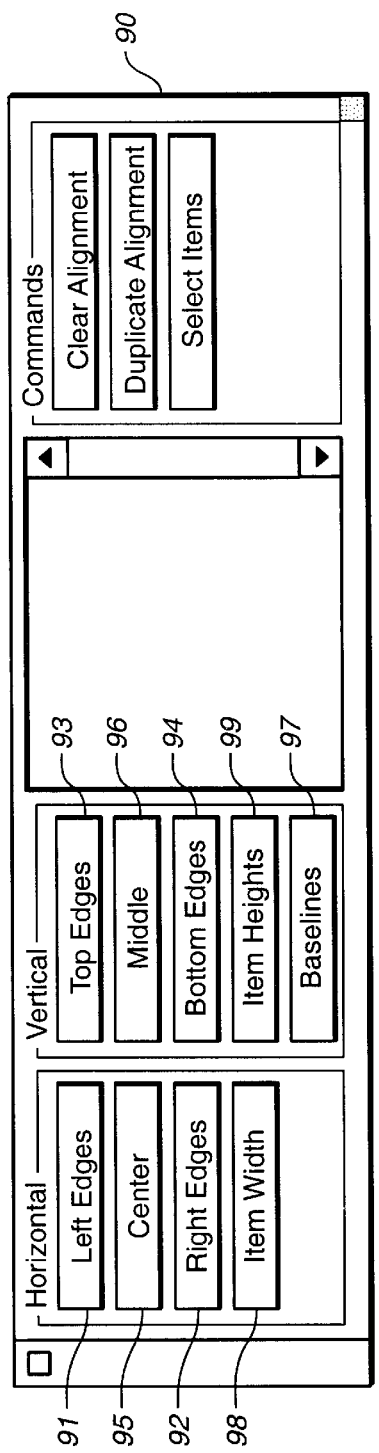
FIG._9
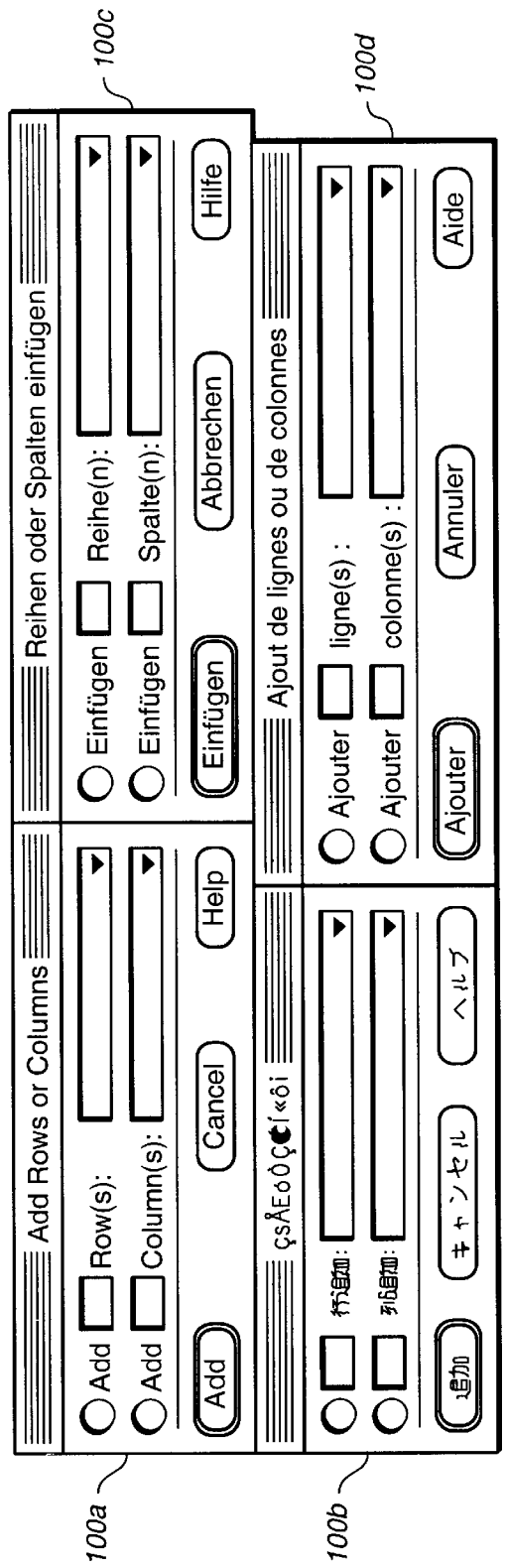
FIG._10

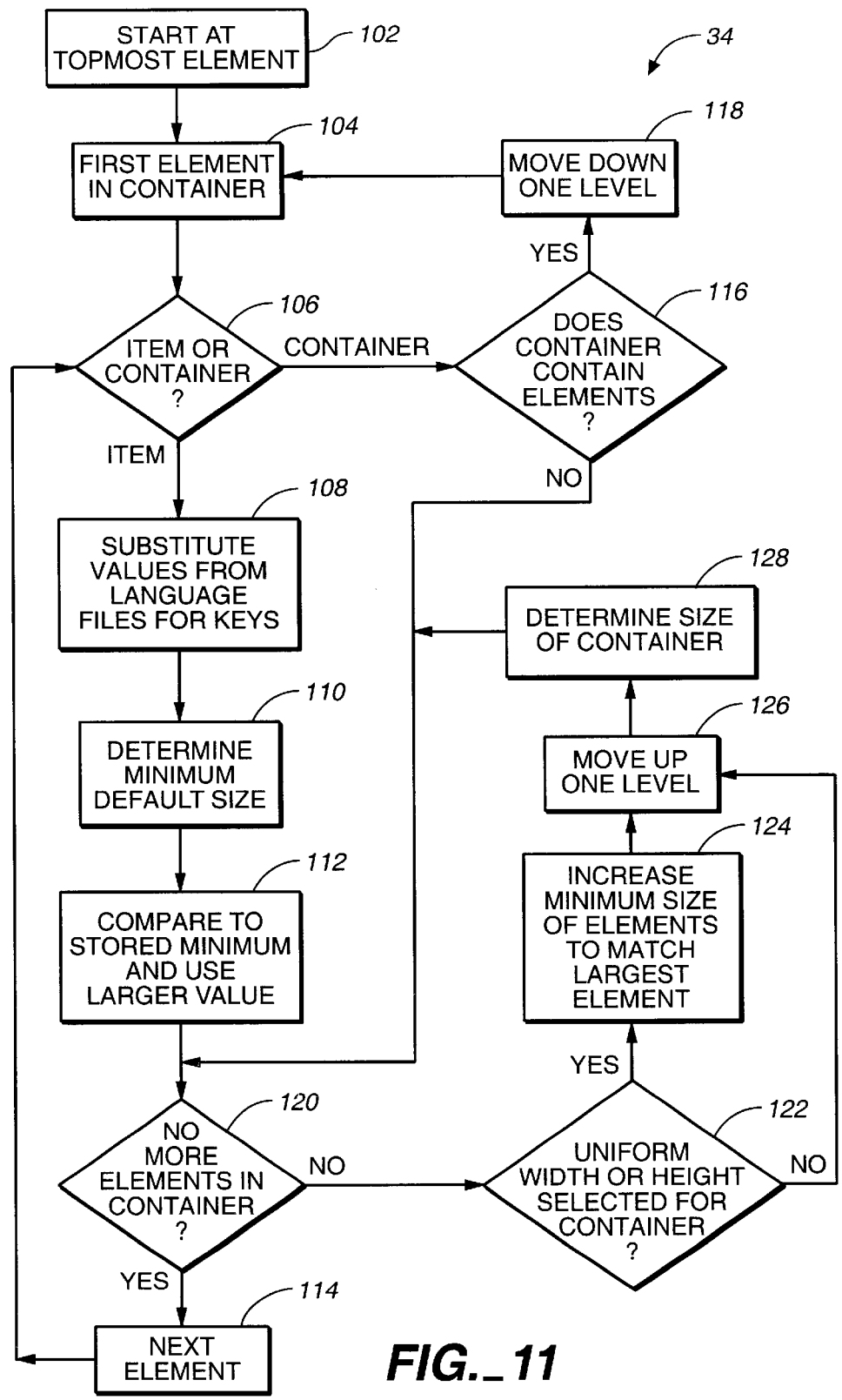
FIG._11

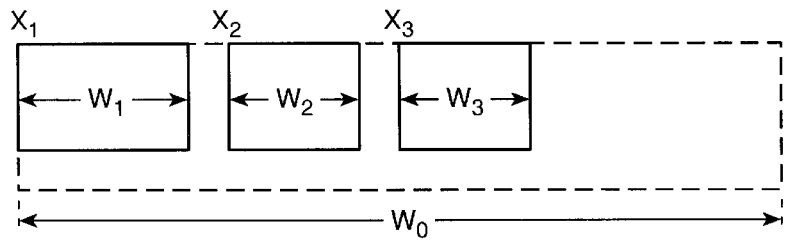
FIG._12A
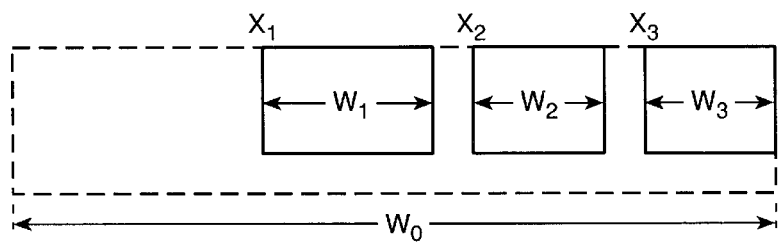
FIG._12B
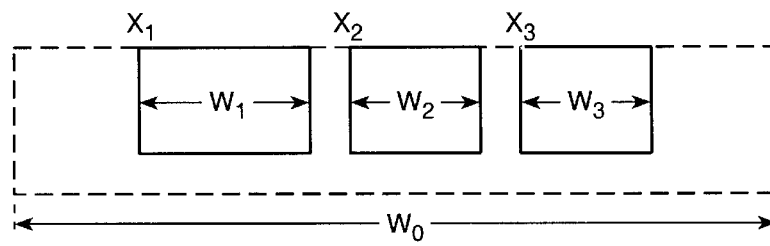
FIG._12C
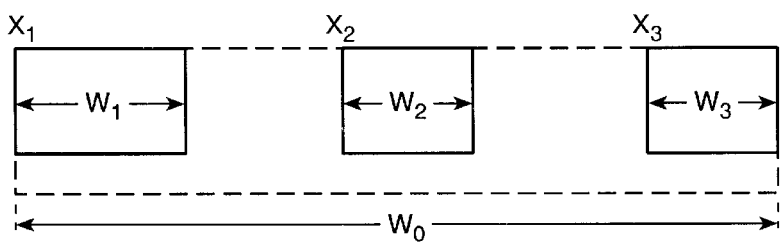
FIG._12D
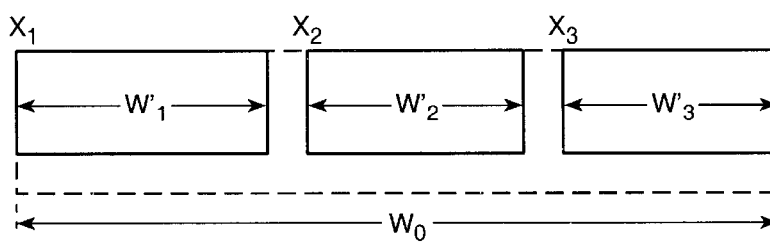
FIG._12E

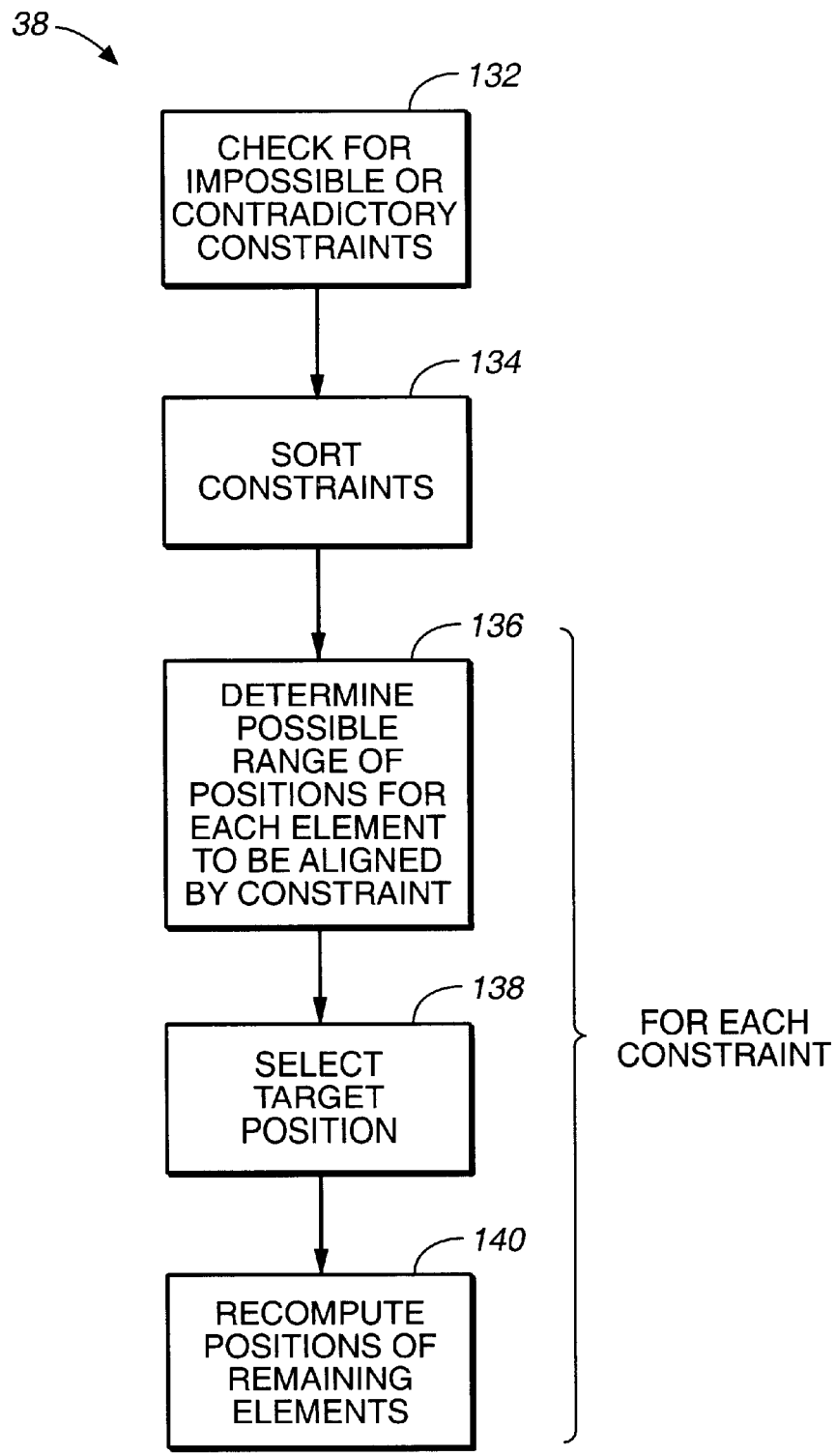
FIG._13

DIALOGS FOR MULTIPLE OPERATING SYSTEMS AND MULTIPLE LANGUAGES

BACKGROUND

The present invention relates generally to graphical user interfaces, and more particularly to the creation and display of dialogs for different operating systems and different languages.

Dialogs are conventional features of computer programs that have a graphical user interface. In general, a dialog is a window containing explanatory text and/or controls for a user to manipulate. For example, a typical dialog that is displayed when the user attempts to delete a file asks "Are you sure?" and provides buttons for the user to press "Delete" or "Cancel".

Many computer programs are designed with versions for different operating systems (e.g., Windows, UNIX, and Macintosh) and different languages (e.g., English, German, French, and Japanese). The text displayed in dialogs in the program's graphical user interface should correspond to the program's language version. For example, the "Cancel" button should contain the text "Abbrechen" in the German version and "Annuler" in the French version. The different text strings used in the dialog for the different languages usually have different sizes. In addition, different operating systems usually have different fonts and controls with different shapes. In short, the size and shape of the elements in a dialog depend upon the operating system and the language. Therefore, a dialog should be laid out for each combination of operating system and language in order to ensure an aesthetically pleasing visual appearance. Conventionally, this layout is performed manually by the developer by dragging each element into a desired position, or by specifying the position and size of each element numerically. Unfortunately, the manual layout process is time-consuming and thus costly.

SUMMARY

In one aspect, the invention is directed to a method of creating a dialog. A dialog definition having a description of the relative positions of a plurality of dialog elements is received in a computer. User input identifying an operating system in which the dialog will be displayed from a plurality of available operating system is received. The size of the elements in the identified operating system is identified in the computer, and the description is interpreted in the computer to lay out the dialog.

Implementations of the invention may include the following. The size of the elements for the identified operating system may be retrieved from a configuration file containing element size information for a plurality of operating systems. The description may include a hierarchical array of dialog elements with at least one container containing at least one dialog element. The description may include a layout direction, a horizontal layout alignment, e.g., left, center, right, flush and expanded justifications, a vertical layout alignment, e.g., top, middle, bottom, baseline, flush and expanded justifications, for each container. The description may also include a layout spacing for each element in the container. One or more default values may be determined. The dialog elements may be located in a dialog window, and laying out the dialog may include determining the positions of the elements in the coordinate system of the dialog window.

In another aspect, the invention is directed to a method of creating a dialog in which a dialog definition having a description of the relative positions of a plurality of dialog elements and a key associated with at least one element is received in a computer. User input identifying a language in which the dialog will be displayed from a plurality of available languages is received, and a language file is received in the computer. The language file contains a text string for the identified language associated with the key. The size of the elements in the identified language is identified with the computer using the text string in the element associated with the key, and the description is interpreted in the computer to lay out the dialog.

Implementations of the invention may include the following. The language file may be selected from a plurality of language files, there being one language file for each available language. Alternately, the text string may be selected from a plurality of text strings in the language file, the language file including one text string for each available language. The dialog definition may include a default text string. The size of the elements may be determined by retrieving font metrics for an operating system and calculating the size of the text string from the font metrics. The text string, which may represent a control property, e.g., a minimum size, of the associated element, may be substituted for the key.

In another aspect, the invention is directed to a method of creating a dialog. A dialog definition is received in a computer, and the description is interpreted in the computer to lay out the dialog. The definition has a hierarchical array of elements including a first container containing a first element and a second element. The hierachical array further includes a third element that is not contained by the first container. The definition has a first portion describing the relative positioning of first and second elements within the first container and a second portion describing the relative positioning of the first and third elements.

Implementations of the invention may include the following. The relative positioning of the first and third elements may be selected from a horizonal alignment, e.g., right edge, center, left edge, and width, and a vertical alignment, e.g., top edge, middle, bottom edge, baseline, and height. The second element may contain the third element, or the first element may contain the third element, or the third element may be the first container, or the hierarchical array may include a second container that contains the first container and the third element.

In another aspect, the invention is directed to a method of creating a dialog. A dialog definition is received in a computer. The definition has a hierarchical array of elements and a first portion describing the relative positioning of elements that are in the same container and a second portion having at least one constraint describing the relative positioning of elements that are not in the same container. The dialog is laid out in the computer according to the first portion of the description to determine default positions for the dialog elements, and the constraints in the second portion of the dialog are applied.

Implementations of the invention may include the following. A minimum size may be determined for each element. The first portion of the description may include at least one alignment term to describe the relative positioning of elements, and the default positions of the elements may be based on the alignment term. The alignment terms may be disregarded when the constraints are applied. The constraint may describe the relative positioning of a first element and a second element. A range of possible positions, e.g., the difference between left and right justifications of that element, may be determined for the first and second elements, a target position in the range of possible positions may be selected, and the first and second elements may be located at the target position. A minimum difference between a target position that satisfies the constraint and the default position may be determined. The elements may not be reduced below their minimum sizes. The other elements in the dialog may be relaid.

In another aspect, the invention is directed to a method of creating a dialog definition, in which a hierarchical array of dialog elements is generated in a computer. The hierarchical array has at least one container containing at least one dialog element. User input is received specifying a layout property for the container describing the relative positions of the dialog elements inside the container, and the hierarchical array and layout properties are stored in a dialog definition.

Implementations of the invention may include the following. A key may be assigned to at least one dialog element, and user input designating a text string may be received. A language file containing the text string and the key may be generated, and the language file may be stored with the dialog definition. The hierarchical array may include a second element that is not in the same container as the first element, and a constraint specifying an alignment between the first and second elements may be added to the description. User input assigning a minimum size to the first element may be received. The layout property may be a layout direction, a layout spacing, a horizontal alignment or a vertical alignment.

The advantages of the invention may include the following. Given a dialog definition, an aesthetically pleasing dialog may be automatically generated for each combination of operating system and language. This significantly reduces the time and cost of generating different versions of a program for different operating systems and languages, and reduces the errors that may occur during manual layout of a dialog. In addition, the invention may be embedded in application programs to generate dialogs in a selected language at run-time. This permits a single program to be used for multiple languages.

Other features and advantages of the invention will become apparent from the following description, including the drawings, the claims and the appendix.

BRIEF DESCRIPTION OF THE DRAWINGS

FIG. 1 is a schematic block diagram of a computer system running a dialog editor program in accordance with the invention.

FIG. 2 is a flow chart of a process of the present invention.

FIG. 3 is a graphical illustration of a dialog definition.

FIG. 4 shows a special properties palette that is part of the user interface of an implementation of the invention.

FIG. 5A shows a language file containing key-value pairs.

FIG. 5B shows a merged language dictionary.

FIG. 6 shows a layout properties palette that is part of the user interface of an implementation of the invention.

FIG. 7 shows a minimum size palette that is part of the user interface of an implementation of the invention.

FIG. 8 shows a group and border palette that is part of the user interface of an implementation of the invention.

FIG. 9 shows a global alignment palette that is part of the user interface of an implementation of the invention.

FIG. 10 shows four dialog boxes generated for four different languages from a single dialog definition.

FIG. 11 is a flow chart of a process of determining a minimum size for the dialog elements.

FIGS. 12A–12E illustrate the effects of various justification properties of a container.

FIG. 13 is a flow chart of a process of attempting to satisfy global alignment constraints.

DETAILED DESCRIPTION

The present invention provides a method for a developer to create and display a "dialog definition", i.e., a description of the dialog that has the position and size of its constituent elements expressed in relative layout rules. These layout rules include expressions of alignment and/or justification of the elements within a container, rather than expressions of the coordinate positions of the elements. In addition, the dialog definition does not contain preset text strings. Rather, a set of text strings is provided for each language in a separate language file. These text strings are keyed to the elements in the dialog that would usually contain text strings. Thus, the dialog definition is not dependent on the actual size of any control or the contents of any text string.

As shown in FIG. 1, a computer system 10 for running a dialog editor program 12 includes a general purpose programmable digital computer 14 (such as a personal computer or workstation), a mass storage device 16 (such as a hard disk drive), a keyboard 18, a pointer device 20 (such as a mouse), and a display 22 for displaying a dialog 100. The computer 14 is of conventional construction, and includes a processor capable of executing computer program instructions, and a memory for storing programs and data. Computer system 10 may also include communications hardware and software by which the computer 14 may be connected to other computers by an intranetwork or internetwork link.

The dialog editor 12 may be used to create and edit a dialog definition 24 that contains a description of the relative positions of the elements in the dialog. Subsequently or concurrently with the creation of the dialog definition, the dialog editor 12 may also be used to create and edit one or more language files 26 that contain the text strings used in the dialog elements. Once the dialog definition 24 and the language files 26 have been generated, the dialog may be laid out by an automatic dialog layout process or algorithm 28. The dialog layout process 28 uses the text strings from one of the language files 26, the relative lay out positioning information from the dialog definition 24, and the control sizes and fonts metrics from the selected operating system to generate the dialog 100. The dialog editor 12 may be centralized on a single computer, or it may be distributed across a computer network.

A process 30 of creating a dialog 100 is illustrated in FIG. 2. First, the user, e.g., a developer, creates a dialog definition and one or more language files using the dialog editor program 12 (step 32). The user creates the dialog definition by adding elements to containers to create a hierarchical array of elements, and selecting the layout direction, spacing, and alignment of the elements in each container. Once the dialog definition has been created, the user may select a language and operating system (step 33). The automatic dialog layout process 28 "interprets" the dialog definition 24 to generate an instance of the dialog for the selected operating system and language. First, the dialog layout process determines the minimum size of the elements in the dialog (step 34). Then the process lays out the dialog using the relative layout rules from the dialog definition to produce default positions for the elements (step 36). The cross-hierarchy constraints are applied to move the elements to their final positions (step 38). The final positions of the elements are described in the coordinate system of the dialog window, e.g., as actual coordinates (x,y) within the dialog window, or as coordinate offsets (Δx,Δy) within each container, as may be required by the operating system or application, rather than terms of alignment or justification. Finally, the dialog is displayed on screen 22 (step 39).

As shown in FIG. 3, the dialog editor 12 provides, as part of a graphical user interface, a graphical depiction of the dialog definition 24. Aspects of the operation of the dialog editor 12 will be described in the terms of the information available in the dialog definition 24 and the operations a user may perform thereon. Although the dialog editor uses a graphical user interface and FIG. 3 is a graphical depiction, the dialog definition 24 may be stored as a text file, such as the text file in Appendix A.

The dialog definition 24 includes a hierarchical array 40 of dialog elements 42a–42u. Each dialog element may correspond to a graphical user interface object that is widely used in various common operating systems, such as UNIX, Windows and Macintosh. The dialog elements may be divided into two classes: containers (indicated by the triangles), which may contain other elements, and items (indicated by the circles), which do not contain other elements. The hierarchical array of dialog definition 24 specifies which elements contain which other elements, and specifies the ordering of the elements within each container. The "top" element in the hierarchy will be a panel 42a which represents the dialog window. The panel 42a may contain both items and containers, which may themselves contain further items and containers. For example, in the illustrated dialog definition, panel 42a includes group 42b, horizontal line 42q and group 42r. Group 42b includes groups 42c and 42j, group 42c includes groups 42d and 42g, and group 42d includes radio button 42e and edit box 42f.

To add an element to the dialog definition 24, an appropriate icon may be dragged and dropped (as shown by phantom line 46) from a dialog element palette 44 into a desired location in the dialog definition 24. Each icon in the dialog element palette 40 represents a type of element that may exist in the dialog definition. For example, the dialog element palette includes containers (such as groups 48a, tables 48b, page tabs 48c, page groups 48d and sheets 48e), controls (such as push buttons 48f, check boxes 48g, radio buttons 48h, text boxes 48j, combo boxes 48k, lists 48t, pop-up lists 48m, pop-up icons 48n and icon buttons 48r) and non-interactive elements (such as text 48p, graphical elements such as vertical lines 48o and horizontal lines 48p, images 48q, pattern swatches 48s and color swatches 48t). Some types of containers, such as tabs and sheets, are controls (i.e., elements that can be manipulated by the user), and other types of containers, such as groups, are non-interactive elements. Elements in the dialog definition 24 may be dragged up and down to change their position in the hierarchy 40. If a container (such as group) is moved, all its contents are moved with it.

Referring to FIG. 4, a special properties palette 50 may be used to assign a variety of conventional properties to the controls in the dialog. For example, buttons (such as buttons 42s–42u) may be noted as the OK, default, cancel, and help buttons to be activated upon the appropriate keystrokes (which depend upon the operating system). In addition, an element may be selected as the first focus in the dialog, a check-box may be indicated as having three states, a hypertext help string may be associated with a control, and scroll bar in a control may be set as a horizontal or vertical scroll bar. Finally, a tag name of another element may be specified so that when the element is touched, the tagged element will be activated as if clicked.

As previously noted, the dialog definition 24 does not contain any strings. Instead, each element that would contain a string (such as a text block or the label for a control) is given a unique identifying key 52 (see FIG. 3). Referring to FIG. 5A, each language file 26 may be a simple text file containing key-value pairs to associate each key 52 from the dialog definition 24 with a language-specific text string 54. As shown in FIG. 1, there may be one language file 26 for each language. For example, there may be an English language file 26a, a German language file 26b, a French language file 26c, and a Japanese language file 26d. Alternately, as shown in FIG. 5B, there may be a merged language file 26' containing a text string 54' for each language. As a third alternative, one set of text strings, such as the text strings for the English version, may be stored in the dialog definition as a default value. This permits the application to operate with a default language if the language files 26 are accidentally damaged or destroyed. Other control properties that are also typically set with text strings, such as control templates, control widths and keyboard shortcuts, may also be stored in the language files 26 and keyed to the controls in the dialog definition 24.

The keys 52 link the text strings to the appropriate element in the dialog. For example, the key "add_rc_1" for button 32t is paired with the text string "Cancel" in the English language file 26a, with the text string "Annuler" in the French language file 26b, and with the text string "Abbrachen" in the German language file 26c.

The keys 52 may be generated automatically as each control is added to the dialog definition, or the keys may be added manually with a text editor. Conventional tools may be used to ensure that each key 52 has a corresponding string in each language file 26, and to ensure that each key in the language file 26 is used in the dialog definition 24. These tools may be available from a project menu on the dialog editor menu bar. The default text strings may be generated in low-bit ASCII so that the default values are compiler independent. When the dialog layout process interprets the dialog definition 24 to create a dialog for a selected operating system and language, the text strings 54 are substituted for the keys 52.

Each container in the hierarchy of the dialog definition has information specifying how the elements in that container are to be arranged relative to each other. As shown in FIG. 6, the relative positions of the elements in each container may be viewed and edited with a layout properties palette 60. Each container is assigned a layout direction 62. The layout direction 62 determines whether the elements in the container are arranged horizontally or vertically. Individual elements may also be assigned a layout spacing 64. The layout spacing 64 determines the relative spacing (e.g., touching, in close proximity, or standard spacing) between the present element and the previous element.

In addition to the layout direction and spacing, the layout properties palette 60 may be used to set a horizontal alignment 66a and a vertical alignment 66b of the elements within each container. Possible choices for horizontal alignment 66a include the following:

| | |
|---|---|
| left: | elements are placed on left side of the container with the requested inter-element spacing. |
| right: | elements are placed on the right side of the container with the requested inter-element spacing. |
| center: | centers the elements at the midline of the container with the requested inter-element spacing. |
| flush: | places the first and last elements flush against the left and right edges of the container, respectively, and extra space is distributed evenly between the elements. |
| expand: | expands the expandable elements in the container so that they fill the entire width of the container. Although the size of text strings will not be adjusted by the expand justification property, the size of other control elements (such as button, pop-up lists, and text boxes) and graphical elements may be expanded. |
| balance: | a mixture of flush justification and expand justification. |

Similarly, possible choices for the vertical alignment 66b of the elements include the following:

| | |
|---|---|
| top: | elements are placed at the top of the container with the requested inter-element spacing. |
| bottom: | elements are place at the bottom of the container with the requested inter-element spacing. |
| middle: | centers the items vertically within the container with the requested inter-element spacing. |
| baseline: | aligns the baselines of the elements in the container |
| flush: | places the first and last elements flush against the top and bottom edges of the container, respectively, and extra space is distributed evenly between the elements. |
| expand: | expands the expandable elements so that they fill the entire height of container. |
| balance: | a mixture of vertical flush and vertical expand justifications. |

The layout properties palette 60 may be used to specify that the elements within a container have a uniform width 68a or a uniform height 68b. If the container is a table, the layout properties palette 60 may be used to set the number of columns 70a and rows 70b in the table. Finally, the layout properties palette 60 may be used to override the default settings for the horizontal expandability 72a and vertical expandability 72b of the controls or containers. The layout properties palette 60 may also be used to determine the layout of various controls, such as the edit box, pop-up list or list box. Each of these layout properties is reflected by an appropriate keyword in the dialog definition text file.

For some controls that have their contents set at run time, such as edit boxes, pop-up lists, or lists, it is necessary to specify a minimum size for the control. For other elements, it may be advantageous to set a minimum size in order to provide an aesthetically pleasing appearance. Referring to FIG. 7, the minimum size of any element may be set with a minimum size palette 80. The minimum size may be set either by specifying sample string 82, or by directly entering the number of em or en spaces for the width 84a and height 84b. The sample strings will be stored in the language files 26 and linked to the element by a key 52. The sample string is retrieved when the dialog definition is interpreted, and the size of the sample string is calculated for the font used by the selected operating system. For example, the minimum size of the edit box 32m is determined by the sample string "999" (see FIGS. 3 and 5B).

Referring to FIG. 8, a group and border palette 75 may be used to manipulate the appearance of group-type dialog elements (e.g., elements 42b, 42c, 42d, 42g, 42j, 42k, 42n, and 42r). The left margin of a group may be indented. The border of the group may be assigned a style or it may be turned off. In addition, the first element in the group may be positioned in the top border so that it provides a group title.

Referring to FIG. 9, dialog elements that are not in the same container may be aligned with a global alignment palette 90. To use the global alignment palette 90, the elements that are to be aligned are selected, e.g., by highlighting the icons from the dialog definition 24 or by clicking on the desired elements in a rendered dialog 100 (see FIG. 10). Then, an alignment type button is pressed, and a cross-hierarchy alignment statement is added to the dialog definition. Specifically, an alignment command with labels associated with the aligned elements may be inserted at the top of the dialog definition text file. The global alignment palette may be used to align the left edges 91, right edges 92, top edges 93, bottom edges 94, center 95, middle 96, or base lines 97 of two or more elements. In addition, the global alignment palette may be used to ensure that two or more elements have the same width 98 or height 99.

Referring to FIG. 10, the dialog definition 24 may be interpreted by the dialog layout process 28 to generate a dialog 100 for each language. For example, a single dialog definition may be used to create an English dialog 100a, a French dialog 100b, a German dialog 100c and a Japanese dialog 100d. As shown, the language-specific text and the size of the controls differs from dialog to dialog, but each dialog has the same general layout. The sample dialog may be generated during the layout process for the user to inspect and review. The dialogs may be interpreted as each element is added to the dialog, and after each layout property is changed, in order to show the result of the modification of the dialog definition. In addition, the sample dialogs themselves may be used as part of the graphical user interface of the dialog editor. For example, the user may click on a control to select it and modify that control's properties.

Once the dialog has been interpreted, it can be expressed in the native form for the platform in which it is to be used. For example, an export module may write the native resources for Mac, Windows and UNIX operating systems. In addition, the dialog definitions, the language files, and the dialog layout process may be incorporated into an application so that dialogs may be generated at run-time in a selected language. This permits a single program to be used for multiple languages.

Referring to FIG. 11, in step 34 the dialog layout process 28 determines the minimum height and width for each dialog element. The dialog layout process uses a recursive search process that searches top down through each container to determine the minimum size of each element in that container, and then determines the minimum size of the container from the minimum size of the contents. In each new container, beginning with the topmost container, e.g., panel 42a, (step 102), the dialog layout process 28 determines whether each element in that container (e.g., elements 42b, 42q and 42r) is an item or a container (step 106) beginning with the first element (e.g., group 42b) in the container (step 104).

If the element is an item, the dialog layout process accesses a configuration file 29 which provides default sizes for each type of control or non-interactive element (e.g., elements 48f–48t from FIG. 3). For an element that contains a text string (e.g., a text block, a control with a label, or a control with a sample string), the appropriate string from the language file 26 is substituted for the key 52 (step 108). After any text substitution, the minimum height and width of the control may be calculated (step 110). For elements containing text strings, the minimum size is based on the length of the string in the system font of the selected operating system. For elements that do not contain text strings, the configuration file 29 provides a default minimum size for each type of control under each operating system. The default size may be measured in a platform-specific unit of length. The calculated minimum size is then compared to the minimum size established by use of the minimum size palette 80, and the larger of these two values is stored as the minimum size for the item (step 112). Assuming there are more elements in the container determined in step 120, the dialog layout process proceeds to the next element in the container (step 114) to determine the minimum size of that element.

If the element under consideration is a container (e.g., group 42c), and assuming the container contains other elements (as determined by step 116), the dialog layout process moves down one level in the hierarchy (to determine the minimum size of that container (step 118). For this container the dialog layout process determines the minimum size of each element (e.g., groups 42d and 42j) in the new container, (returning to step 104) beginning with the first element in the container (e.g., group 42d). Once the minimum size of each element in the container has been calculated (determined in step 120), the dialog layout process may check whether the layout properties specify that the elements in the container have a uniform width or uniform height (step 122). If the dialog elements have a uniform width or height, the minimum sizes of the elements are adjusted to match the minimum of the largest element in the container (step 124).

Once all of the elements in the container have been given a minimum size, the dialog layout process moves up one level (e.g., from group 42c back to group 42b) (step 126). The dialog layout process then determines the minimum size of the container (step 128). The minimum size of the container is calculated by the minimum size of the elements in that container, their layout, and the spacing between the elements (the layout direction and spacing were selected with the layout properties palette 60). For example, if the elements are arranged vertically, then the minimum height of the container is equal to the sum of the minimum heights of the elements in the container, and the minimum width of the container is equal to the largest minimum width of any item in the container. Conversely, if the elements in the container are arranged horizontally, then the minimum height of the container is equal to the largest minimum height of the elements in the container, and the minimum width of the container is equal to the sum of the minimum widths of the elements in the container. The dialog layout process also increases the minimum width and height of the container based on the spacing between the elements. The configuration file 29 may store a platform-specific distance for each relative spacing, e.g., touching, proximity or standard spacing, for each operating system. Furthermore, if the container has a visible border, the dialog layout process adds additional space for a reserved margin inside the border. The dialog layout process may also apply various special rules in order to adjust the spacing between the elements. For example, the dialog layout process may search for text labels ending in a colon, that are followed by a popup control, and apply minimum spacing between these two elements.

Once the minimum size of all the elements in the dialog definition have been calculated, the dialog layout dialog layout process determines the default locations of the elements according to the layout properties. This is a top-down procedure in which the positioning of each element in a container may be calculated before the positioning of any elements in subcontainers. The positions of the elements in the containers may be calculated from the minimum sizes of the elements, the spacing, and the selected justification or alignment.

Referring to FIGS. 12A–12E, an exemplary horizontal alignment will be described for a container (e.g., group 42r) having a minimum width of $W_0$ holding three elements (e.g., buttons 42s–42t) having minimum widths $W_1$, $W_2$ and $W_3$, respectively, and spacings $S_1$ and $S_2$. This exemplary embodiment assumes that the position of an element (X,Y) is described by the coordinate of its upper left-hand corner.

Referring to FIG. 12A, in left justification, the elements are positioned at the left edge of the container with the minimum spacing. Thus, $X_1 = X_0$ $X_2 = X_0 + W_1 + S_1$ $X_3 = X_0 + W_1 + W_2 + S_1 + S_2$ Referring to FIG. 12B, in right justification, the elements are positioned at the right edge of the container with the minimum spacing. Thus, $X_1 = X_0 + W_0 - (W_1 + W_2 + W_3) - (S_1 + S_2)$ $X_2 = X_0 + W_0 - (W_2 + W_3) - S_1$ $X_3 = X_0 + W_0 - W_3$ Referring to FIG. 12C, in center justification, the elements are positioned at the midline of the container with the minimum spacing. Thus, $X_1 = X_0 + W_0/2 - (W_1 + W_2 + W_3 + S_1 + S_2)/2$ $X_2 = X_0 + W_0/2 - (W_1 + W_2 + W_3 + S_1 + S_2)/2 + W_1 + S_1$ $X_3 = X_0 + W_0/2 - (W_1 + W_2 + W_3 + S_1 + S_2)/2 + W_1 + W_2 + S_1 + S_2$ Referring to FIG. 12D, in flush justification, the left and right elements are flush with the left and right edges of the container, and the remaining space is evenly divided between the elements. Thus, $X_1 = X_0$ $X_2 = X_0 + W_1 + (W_0 - (W_1 + W_2 + W_3))/2$ $X_3 = X_0 + W_0 - W_3$ Referring to FIG. 12E, in expand justification, any remaining space in the container is added to the expandable elements. The extra space is evenly divided between each expandable element. Expand justification is otherwise treated as left justification. Assuming all the elements are expandable, $X_1 = X_0$ $W'_1 = W_1 + (W_0 - (W_1 + W_2 + W_3 + S_1 + S_2))/3$ $X_2 = X_0 + W'_1 + S_1$ $W'_2 = W_2 + (W_0 - (W_1 + W_2 + W_3 + S_1 + S_2))/3$ $X_3 = X_0 + W'_1 + W'_2 + S_1 + S_2$ $W'_3 = W_3 + (W_0 - (W_1 + W_2 + W_3 + S_1 + S_2))/3$ where $W'_1$, $W'_2$ and $W'_3$ represent the expanded widths of the three containers.

Where the dialog description does not include any of the relative layout rules, such as a layout direction, a layout spacing, a horizontal layout alignment, or vertical layout alignment, the process may assume a default positioning, e.g., vertical layout, normal spacing, left justification, and top justification (if vertically laid out) or baseline justification (if horizontally laid out).

Once the default position of each element in the container has been calculated, the default positions of the elements in any subcontainers may be calculated. For example, once the positioning of group 42b, line 42q and group 32r have been calculated, positions of groups 42c and 42h may be calculated.

Once the default positions of the elements have been determined, the dialog layout process attempts to apply the cross-hierarchy constraint (step 38). The dialog layout algorithm 28 attempts to satisfy as many constraints are possible with the minimum possible change to the size and position of the elements. Referring to FIG. 13, the algorithm first checks for impossible or contradictory constraints (step 132). For example, the dialog layout process may ignore a constraint that requests alignment of the left or right edges of two elements that are arranged horizontally in the same container. Similarly, the dialog layout process may ignore a constraint that requests alignment of the top or bottom edges of two elements that are arranged vertically in the same container.

Once the impossible restraints have been rejected, the remaining constraints are sorted (step 134). The constraints are sorted into two types, horizontal constraints (e.g., alignment of the left or right edges) and vertical constraints (e.g., alignment of the top edge, bottom edge or baseline). The horizontal constraints are sorted left to right, and the vertical constraints are sorted top to bottom.

The dialog layout process them attempts to satisfy each constraint in the order as sorted, i.e., beginning with the left-most constraint and working rightwards, and then each vertical constraint, beginning with the topmost constraint and working downwards. For each constraint, three possible ranges of positions for each constrained element is calculated (step 136).

First, the dialog layout process determines the range of positions that are available for the constrained elements if the elements in the container are moved. In general, this range of positions is determined by ignoring the alignments of the containers that contain the constrained elements. Specifically, the left-most position of a constrained element may be calculated as if its container had left justification, and the right-most position of that element may be calculated as if its container had right justification. Similarly, the top most position of the element may be calculated as if its container had a top justification, and the bottom-most position of the element may be calculated as if its container had a bottom justification. These boundaries may be calculated from the minimum size information that was generated in step 134.

Second, the dialog layout process determines the range of positions for the constrained elements if the elements in the container are moved and shrunk. However, the size of the elements is not allowed to be reduced below the minimum size specified in step 134. Thus, in general, this range of positions is determined by ignoring the effects of an expanded or balanced justification on the containers.

Third, the dialog layout process determines the range of positions for the constrained elements if the elements in the container are moved and shrunk and the parent container is enlarged. The parent container may be enlarged the container is expandable, has not been fixed in size (e.g., by another constraint), and if doing so would not require moving or shrinking the other elements in the parent container's container.

Given the possible range of locations for each constrained element, the dialog layout process selects a target position for the constrained elements (step 138). Specifically, the dialog layout process searches for areas of overlap in the positional ranges. The dialog layout process selects the overlapping range that will satisfy the constraint for the maximum number of elements. The process may preferentially violate some layout rules over other layout rules. For example, if possible, the process selects a range which only requires that the other elements be moved (determined in the first step). If this does not satisfy all the constraints, the process selects a range that violates the expanded or balanced justifications (determined in the second pass). Finally, if the constraints are still not satisfied, the process may select a range which enlarges the parent container (determined in the third step).

Within the selected range, a target position is selected that results in the least movement of the constrained elements. For the elements that are not in the overlapping range, a new position is selected that is as close as possible to the target position, while still being within the permitted range for that element.

Once the target position is selected, the elements of the container which were not involved in the constraint are re-laid out (step 140). Any constrained portion of an element in the container is treated as fixed in place, the container is divided into two regions, i.e., left and right of the constrained portion of the element. There may be more than two regions if other elements in the container have already been subject to constraints. Any remaining space in the container is calculated for each region. Then the alignment properties of the container are applied to each region individually. The elements are repositioned and resized within the container with the minimal possible change from their previous sizes and positions. Finally, any elements inside any container that has been moved or resized are themselves repositioned according to the alignment rules of the repositioned container. The dialog layout process works through each constraint, treating previously constrained elements as fixed during the calculation of the range of possible positions of the elements.

Once the absolute position of each element in the dialog definition 24 has been calculated, the dialog has been interpreted and it may be displayed or exported to create native resources for the desired operating system. In addition, the invention may be embedded in application programs to generate dialogs in a selected language at run-time. This permits a single program to be used for multiple languages. This significantly the time and cost of generating aesthetically pleasing versions of a program for different operating systems and languages is significantly reduced, as are the errors that may occur during manual layout of a dialog.

The invention may be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output. The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

What is claimed is:

1. A method of creating a dialog, comprising:
receiving a dialog definition in a computer for a dialog having a graphical user interface including visible text and/or controls for a user to manipulate, the definition having a hierarchical array of elements including a first graphical user interface layout container including a first display element and a second display element, the hierarchical array further including a third display element that is not contained by the first container, the definition having a first portion describing the relative positioning of first and second display elements of the first container on the graphical user interface and a second portion describing the relative positioning of the first and third display elements on the graphical user interface, wherein the second portion includes cross-hierarchical constraints on positions on the graphical user interface between display elements of separate containers;
interpreting the dialog definition in the computer to lay out the dialog, including calculating a final position of the display elements on the graphical user interface using the relative positioning described in the first portion and the cross-hierarchical constraints included in the second portion; and
displaying the dialog on the graphical user interface.

2. The method of claim 1, wherein the relative positioning of the first and third display elements is selected from horizontal alignment and vertical alignment.

3. The method of claim 2, wherein the horizontal alignment is selected from right edge, center, left edge, and width.

4. The method of claim 2, wherein the vertical alignment is selected from top edge, middle, bottom edge, baseline, and height.

5. The method of claim 1, wherein the third display element is the first container.

6. The method of claim 1, wherein the hierarchical array includes a second graphical user interface layout container that contains the first container and the third display element.

7. The method of claim 1, wherein the relative positioning of the first and second display elements and the relative positioning of the first and third display elements includes relative alignment or justification and does not include coordinate positions.

8. The method of claim 1, further comprising receiving a dialog definition that does not contain a preset text string.

9. The method of claim 1, wherein calculating a final position of the display elements includes:
calculating default positions of the display elements in the first container using the first portion; and
after calculating the default positions, applying the cross-hierarchical constraints to calculate a final position of the display elements.

10. The method of claim 1, wherein calculating a final position of the display elements on the graphical user interface includes:
checking for impossible or contradictory cross-hierarchical constraints;
if any impossible or contradictory cross-hierarchical constraints are found, rejecting the impossible or contradictory cross-hierarchical constraints;
sorting remaining cross-hierarchical constraints into vertical and horizontal constraints, creating a sorted order of cross-hierarchical constraints; and
applying the cross-hierarchical constraints in the sorted order.

11. A method of creating a dialog, comprising:
receiving a dialog definition in a computer for a dialog having a graphical user interface, the definition having a hierarchical array of elements operable to be displayed on the graphical user interface, the definition having a first portion describing the relative positioning on the graphical user interface of elements that are in the same layout container and a second portion having at least one cross-hierarchical constraint describing the relative positioning on the graphical user interface of elements that are not in the same layout container,
laying out the dialog in the computer according to the first portion of the dialog definition to determine default positions on the graphical user interface for the dialog elements;
applying the constraints in the second portion of the dialog definition to determine final positions on the graphical user interface for the dialog elements; and
displaying the dialog on the graphical user interface.

12. The method of claim 11, wherein laying out the dialog includes determining a minimum size for each element.

13. The method of claim 12, wherein the first portion includes at least one alignment term to describe the relative positioning of elements, and laying out the dialog further includes determining a default position for each element based on the alignment term.

14. The method of claim 13, wherein applying the constraints includes disregarding the alignment term.

15. The method of claim 13, wherein the constraint describes the relative positioning of a first element and a second element.

16. The method of claim 15, wherein applying the constraints includes determining a range of possible positions for the first and second elements, selecting a target position in the range of possible positions, and locating the first and second elements at the target position.

17. The method of claim 16, wherein selecting the target position includes determining a minimum difference between a target position that satisfies the constraint and the default position.

18. The method of claim 16, wherein determining the range of possible positions for an element includes determining a difference between left and right justifications of that element.

19. The method of claim 15, wherein the elements are not reduced below their minimum sizes.

20. The method of claim 11, wherein the relative positioning of elements that are in the same layout container and the relative positioning of elements that are not in the same layout container includes relative alignment or justification and does not include coordinate positions.

21. The method of claim 11, further comprising receiving a dialog definition that does not contain a preset text string.

22. The method of claim 11, wherein applying the constraints in the second portion of the dialog comprises:
checking for impossible or contradictory constraints;
if any impossible or contradictory constraints are found, rejecting the impossible or contradictory constraints;
sorting remaining constraints into vertical and horizontal constraints, creating a sorted order of constraints; and
applying the constraints in the sorted order.

23. A computer program product, tangibly stored on a computer-readable medium, for creating a dialog, comprising instructions operable to cause a programmable processor to:
receive a dialog definition in a computer for a dialog having a graphical user interface including visible text and/or controls for a user to manipulate, the definition having a hierarchical array of elements including a first graphical user interface layout container including a first display element and a second display element, the hierarchical array further including a third display element that is not contained by the first container, the definition having a first portion describing the relative positioning of first and second display elements of the first container on the graphical user interface and a second portion describing the relative positioning of the first and third display elements on the graphical user interface, wherein the second portion includes cross-hierarchical constraints on positions on the graphical user interface between display elements of separate containers;
interpret the dialog definition in the computer to lay out the dialog, including calculating a final position of the display elements on the graphical user interface using the relative positioning described in the first portion and the cross-hierarical constraints included in the second portion; and
display the dialog on the graphical user interface.

24. The computer program product of claim 23, wherein the relative positioning of the first and third display elements in selected from horizontal alignment and vertical alignment.

25. The computer program product of claim 24, wherein the horizontal alignment is selected from right edge, center, left edge, and width.

26. The computer program product of claim 24, wherein the vertical alignment is selected from top edge, middle, bottom edge, baseline, and height.

27. The computer program product of claim 23, wherein the third display element is the first container.

28. The computer program product of 23, wherein the hierarchical array includes a second graphical user interface layout container that contains the first container and the third display element.

29. The computer program product of claim 23, wherein the relative positioning of the first and second display elements and the relative positioning of the first and third display elements includes relative alignment or justification and does not include coordinate positions.

30. The computer program product of claim 23, further comprising instructions operable to receive a dialog definition that does not contain a preset text string.

31. The computer program product of claim 23, wherein instructions operable to calculate a final position of the display elements include instructions operable to:
calculate default positions of the display elements in the first container using the first portion; and
after calculating the default positions, apply the cross-hierarchical constraints to calculate a final position of the display elements.

32. The computer program product of claim 23, wherein instructions operable to calculate a final position of the display elements on the graphical user interface include instructions operable to:
check for impossible or contradictory cross-hierarchical constraints;
if any impossible or contradictory cross-hierarchical constraints are found, reject the impossible or contradictory cross-hierarchical constraints;
sort remaining cross-hierarchical constraints into vertical and horizontal constraints, creating a sorted order of cross-hierarchical constraints; and
apply the cross-hierarchical constraints in the sorted order.

33. A computer program product, tangibly stored on a computer-readable medium, for creating a dialog, comprising instructions operable to cause a programmable processor to:
receive a dialog definition in a computer for a dialog having a graphical user interface, the definition having a hierarchical array of elements operable to be displayed on the graphical user interface, the definition having a first portion describing the relative positioning on the graphical user interface of elements that are in the same layout container and a second portion having at least one cross-hierarchical constraint describing the relative positioning on the graphical user interface of elements that are not in the same layout container;
lay out the dialog in the computer according to the first portion of the dialog definition to determine default positions on the graphical user interface for the dialog elements;
apply the constraints in the second portion of the dialog definition to determine final positions on the graphical user interface for the dialog elements; and
display the dialog on the graphical user interface.

34. The computer program product of claim 33, wherein instructions operable to lay out the dialog include instructions operable to determine a minimum size for each element.

35. The computer program product of claim 34, wherein the first portion includes at least one alignment term to describe the relative positioning of elements, and instructions operable to lay out the dialog further include instructions operable to determine a default position for each element based on the alignment terms.

36. The computer program product of claim 35, wherein instructions operable to apply the constraints include instructions operable to disregard the alignment term.

37. The computer program product of claim 35, wherein the constraint describes the relative positioning of a first element and a second element.

38. The computer program product of claim 37, wherein instructions operable to apply the constraints include instructions operable to determine a range of possible positions for the first and second elements, select a target position in the range of possible positions, and locate the first and second elements at the target position.

39. The computer program product of claim 38, wherein instructions operable to select the target position include instructions operable to determine a minimum difference between a target position that satisfies the constraint and the default position.

40. The computer program product of claim 38, wherein instructions operable to determine the range of possible positions for an element include instructions operable to determine a difference between left and right justifications of that element.

41. The computer program product of claim 37, wherein the elements are not reduced below their minimum sizes.

42. The computer program product of claim 33, wherein the relative positioning of elements that are in the same layout container and the relative positioning of elements that are not in the same layout container includes relative alignment or justification and does not include coordinate positions.

43. The computer program product of claim 33, further comprising instructions operable to receive a dialog definition that does not contain a preset text string.

44. The computer program product of claim 33, wherein instructions operable to apply the constraints in the second portion of the dialog comprise instructions operable to:

check for impossible or contradictory constraints;

if any impossible or contradictory constraints are found, reject the impossible or contradictory constraints;

sort remaining constraints into vertical and horizontal constraints, creating a sorted order of constraints; and apply the constraints in the sorted order.

\* \* \* \* \*

UNITED STATES PATENT AND TRADEMARK OFFICE
CERTIFICATE OF CORRECTION

PATENT NO. : 6,785,866 B1
DATED : August 31, 2004
INVENTOR(S) : Lance Lewis et al.

It is certified that error appears in the above-identified patent and that said Letters Patent is hereby corrected as shown below:

Column 13,
Line 67, insert a space between "or" and "justification";

Column 14,
Line 33, delete "," and insert -- ; --;

Column 15,
Line 43, delete "cross-hierarical" and insert -- cross-hierarchical --;

Column 16,
Line 57, delete "terms" and insert -- term --.

Signed and Sealed this

Eighth Day of February, 2005

JON W. DUDAS
*Director of the United States Patent and Trademark Office*